Figure 1:
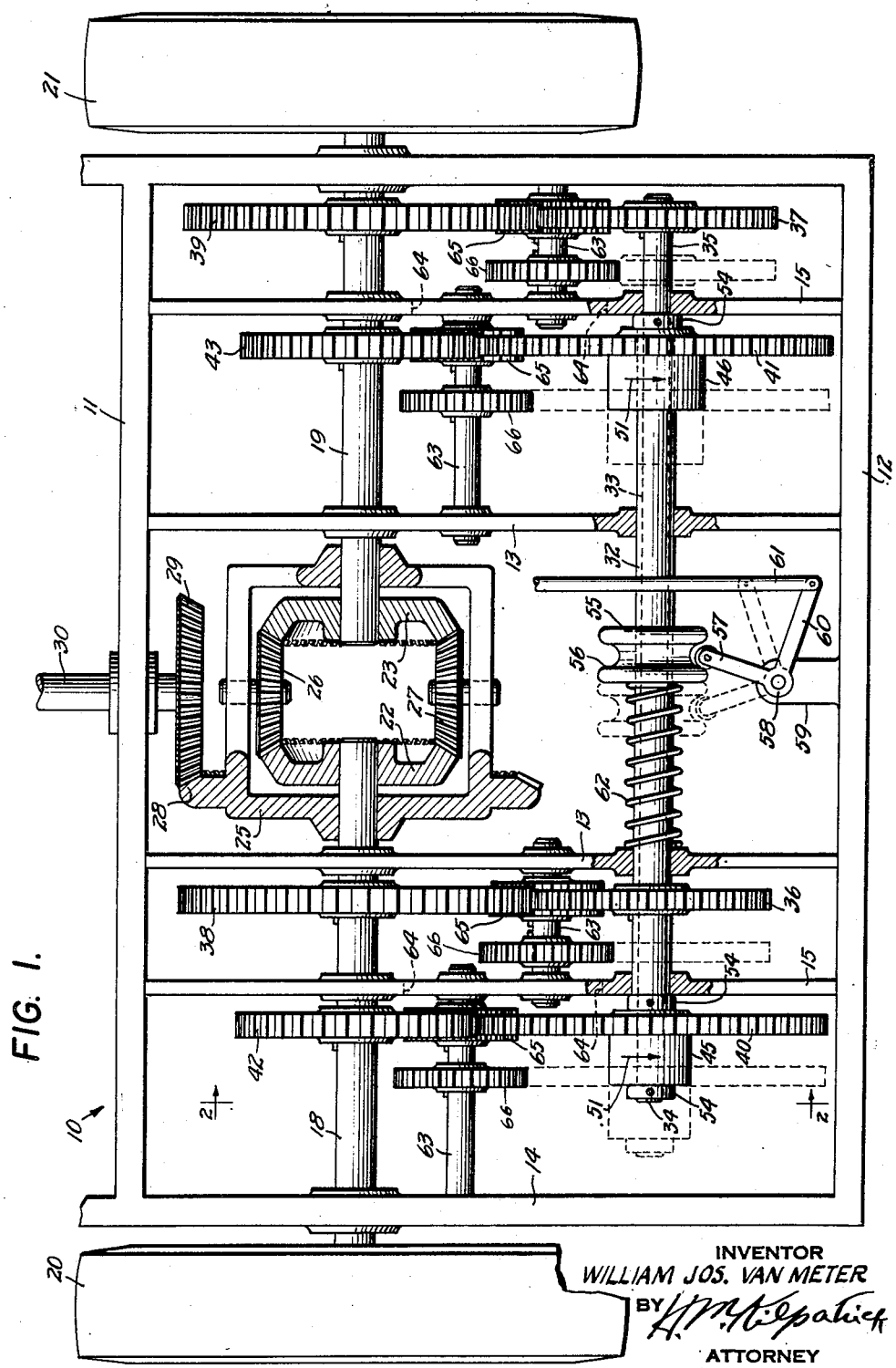

June 7, 1955     W. J. VAN METER     2,709,927
DIFFERENTIAL GEAR CONTROL MECHANISM Filed Jan. 5, 1950     3 Sheets-Sheet 1

INVENTOR
WILLIAM JOS. VAN METER
BY
ATTORNEY

June 7, 1955  W. J. VAN METER  2,709,927
DIFFERENTIAL GEAR CONTROL MECHANISM
Filed Jan. 5, 1950  3 Sheets-Sheet 2
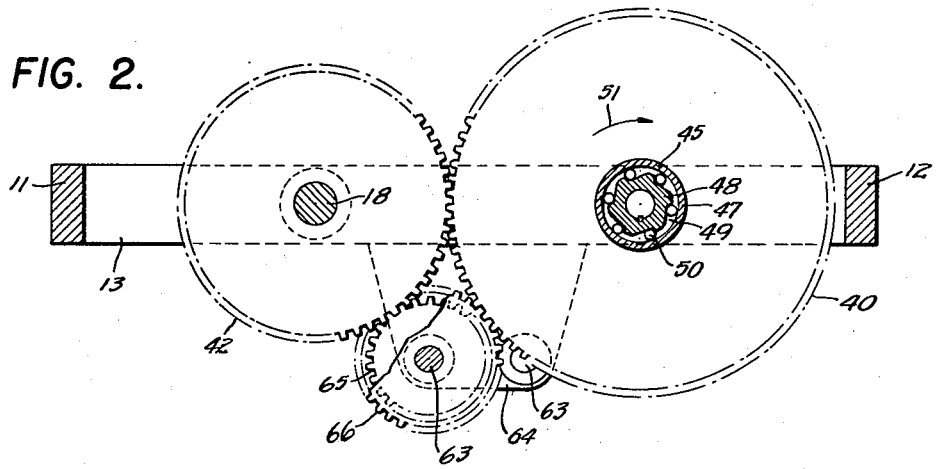
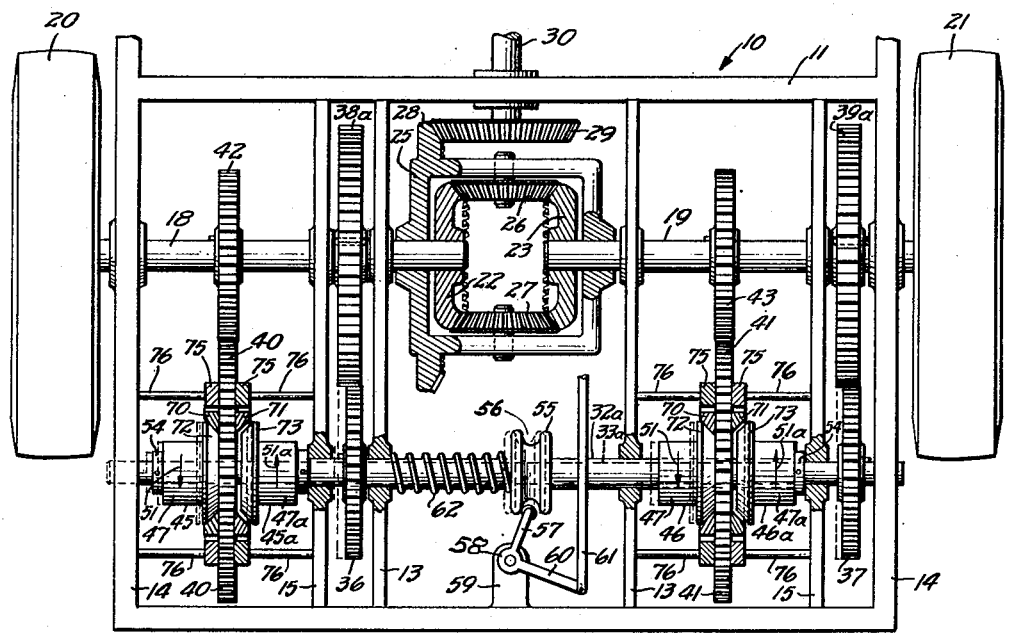
INVENTOR
WILLIAM JOS. VAN METER
BY
ATTORNEY June 7, 1955 W. J. VAN METER 2,709,927
DIFFERENTIAL GEAR CONTROL MECHANISM
Filed Jan. 5, 1950 3 Sheets-Sheet 3

INVENTOR
WILLIAM JOS. VAN METER
BY *H. M. Kilpatrick*
ATTORNEY

United States Patent Office

2,709,927
Patented June 7, 1955

2,709,927

DIFFERENTIAL GEAR CONTROL MECHANISM

William J. Van Meter, Macon, Mo.

Application January 5, 1950, Serial No. 136,887

12 Claims. (Cl. 74—711)

This invention relates to driving or power transmission mechanism for automobiles and other vehicles and to means for controlling such mechanisms and more particularly to mechanisms for controlling differential systems for vehicles, though it is noted that the invention is not limited to vehicles.

One object of the invention is to provide a control mechanism for differential systems which will enable the differential system to drive the vehicle while one drive wheel is resting on a good traction surface while the other is resting on snow or mud.

Other objects of the invention are to provide a control mechanism of this kind which will not interfere with driving of the vehicle around corners, and which will operate when the vehicle is going forwardly or rearwardly.

Another object of the invention is to provide a control mechanism for differentials which requires that the speed ratio between the drive wheels driven by such differentials never exceed a predetermined value (which value is determined by the specific design of the mechanism, and can be designed to any desired limiting ratio) and yet which will permit the drive wheels to continuously assume any ratio demanded by the operating conditions which does not exceed the limiting ratio designed for that particular system.

Additional objects of the invention are to effect simplicity and efficiency in such mechanism and to provide an extremely simple mechanism of this kind which is durable and reliable in operation and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with several forms of a differential control mechanism associated with a conventional differential, and comprising means for preventing excessive ratios between the speed of similar elements such as the planet gears of the differential or the spindles driven thereby, and comprising a train of mechanism having an active part controlling one or more of such elements to constrain its movement to prevent such excessive ratios between the speeds of similar elements and a motion part driven by another of the elements of the system such as one of the spindles or the power means driving the differential.

Figure 5:
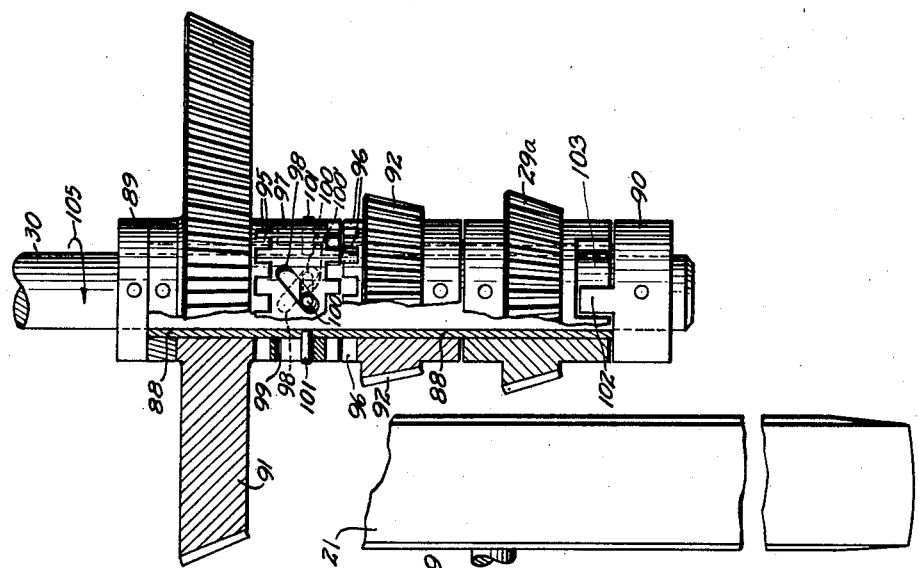
Figure 4:
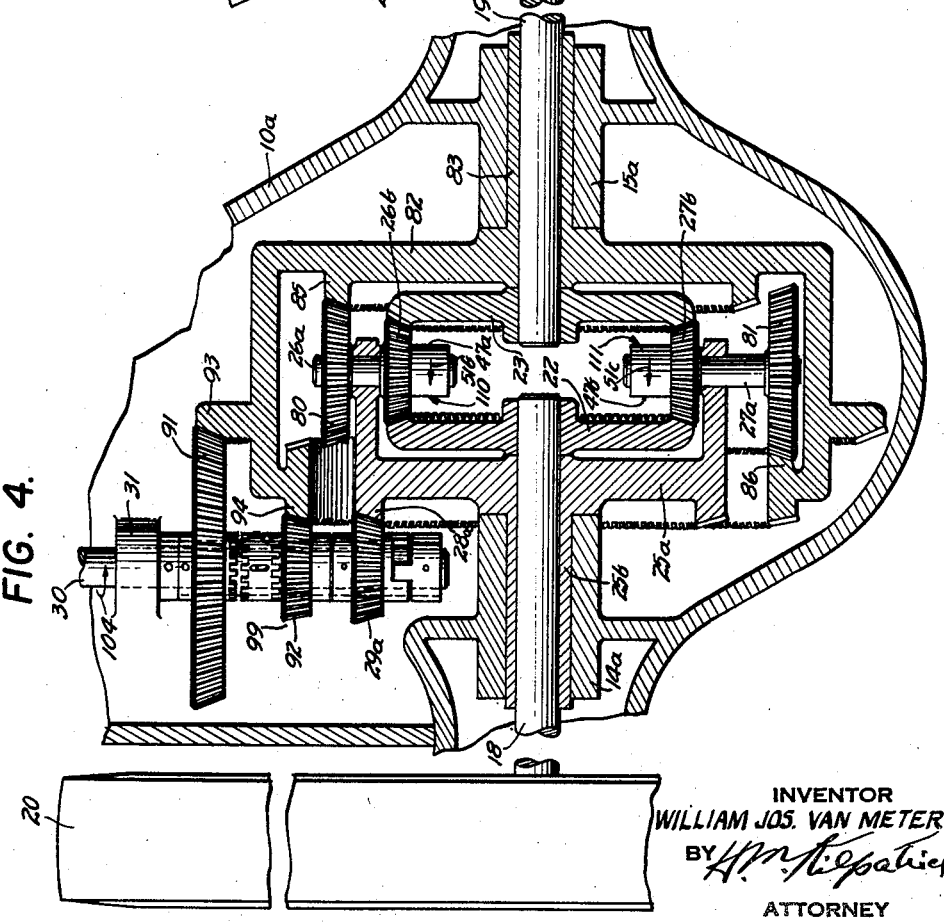

In the accompanying drawings showing by way of example several of many possible embodiments of the invention, Figs. 1, 3 and 4 are plans showing different forms of the invention, parts being shown in section;

Fig. 2 shows a section taken on the line 2—2 of Fig. 1 looking in the direction of the arrows of said line, and Fig. 5 is a plan on a larger scale of a detail of Fig. 4, parts being shown in section.

The various parts of my improved differential control mechanism as shown in Figs. 1 and 2 may be mounted in any suitable manner and are herein shown mounted on a vehicle chassis or frame 10 comprising front and rear cross pieces 11, 12 and inner, outer and intermediate longitudinal pieces 13, 14, 15, connecting the cross pieces. Conventional transverse drive spindles 18, 19 mounted in bearings in the longitudinal pieces are shown carrying road wheels 20, 21 at the outer end and differential sun miter gears 22, 23 on their lower ends adjacent to each other. A differential spider 25 loosely rotary on one or both of the spindles and rotatably carrying planet gears 26, 27 meshing with the sun gears is formed with a ring gear 28 coaxial with the shafts and meshing with a main drive miter gear 29 carried on the longitudinal main drive shaft 30 having its rear part rotatably mounted in the front cross piece 11.

The differential control mechanism includes an outer tubular countershaft 32 rotatably mounted in said inner pieces 13 and one of the intermediate pieces 15 parallel to the drive spindles rotatably receiving an inner countershaft 33 having projecting ends 34, 35 one of which is rotatably mounted in one of said longitudinal pieces 15.

Small gears 36, 37 respectively mounted fast on one end of said tubular countershaft 32 and the opposite end of the inner shaft 33, respectively mesh with larger gears 38, 39 mounted fast on the spindles 18 and 19 respectively, whereby each countershaft rotates faster than its associated spindle.

Large free wheeling gears or active parts 40, 41 are mounted free on said countershafts respectively at the end of each shaft remote from said small gear of the same shaft; and smaller gears 42, 43 fast on the respective spindles normally mesh with the free wheeling gears, whereby when the spindles rotate forwardly with the same speed as each other, each free wheeling gear rotates at slower speed than, and in the direction of, its associated countershaft.

Ratchet clutch assemblies 45, 46 are disposed on the countershafts 33, 32 respectively adjacent to the associated free wheeling gears 40, 41 and connecting each free wheeling gear with the associated countershaft.

Each assembly may be any conventional ratchet mechanism, such as the one shown in Fig. 2 comprising an outer drive element 47 secured fast to the free wheeling gear, and the inner driven element 48 secured fast to the countershaft and having wedge-shaped recesses 49 in which are received rollers 50 adapted to jam when the outer drive element 48 tends to move in the direction of the arrow 51 faster than or relative to the inner driven element and adapted to allow the countershaft and the inner driven element to overrun the outer element and the free wheeling gear in the direction of the arrow.

There will be free wheeling between the gear 41 and shaft 32 as long as the speed ratio between wheels 21 and 20

$$\frac{(\text{speed } 21)}{(\text{speed } 20)}$$

does not equal or exceed $$\frac{T(41)}{T(43)} \times \frac{T(38)}{T(36)}$$

where T(41) is the number of teeth on gear 41, etc. When $$\frac{(\text{speed } 21)}{(\text{speed } 20)} \text{ equals } \frac{T(41)}{T(43)} \times \frac{T(38)}{T(36)}$$

the two elements of the free wheeling assembly are rotating at the same speed, and any tendency of the ratio $$\frac{(\text{speed } 21)}{(\text{speed } 20)}$$

to increase in value results in the jamming of the free wheeling rollers so that shaft 33 would be driven by gear 41, and back through gears 36 and 38 and spindle 18 to wheel 20, and thus maintain the speed of wheel 20 at a minimum of $$\frac{T(43)}{T(41)} \times \frac{T(36)}{T(38)}$$

times speed of wheel 21.

Thus the countershaft may normally free wheel in the direction of the arrow 51 when the vehicle is moving normally forwardly. Thus when the car is moving normally forwardly in a straight line, both countershafts 32, 33 may turn in the direction of the arrows faster than their associated free wheeling gears without driving the later, and in view of the gear ratios shown, both countershafts may free wheel when all ordinary turns of the vehicle are made.

But when the spindle carrying the smaller gear meshed with said associated free wheeling gear turns forward much faster than the other spindle and the associated free wheeling gear tends to turn faster than its associated countershaft, the assembly drives the countershaft which cooperates with the associated small gear and larger gear meshed therewith to drive said other spindle forwardly.

Thus when the driver is attempting to drive the vehicle forwardly when one wheel 20 is on suitable pavement while the other wheel 21 is slipping in mud or snow or on ice, the spindle 19 carrying the slipping wheel 21 and the smaller gear 43 meshed with the associated free wheeling gear 41 turns forward much faster than the other spindle 18, and causes the associated free wheeling gear 41 and the fastly connected drive element 47 of the assembly 46 to tend to turn faster in the direction of the arrow than the associated driven element 48 and tubular countershaft 32 thus causing the ratchet assembly 46 to drive the tubular countershaft 32, which then cooperates with the associated small gear 36 fast thereon and larger gear 38 meshed therewith to drive the other spindle 18 and wheel 20 forwardly thus to drive the vehicle forwardly.

When the driver is attempting to drive the vehicle forwardly when the wheel 21 is on suitable pavement while the wheel 20 is slipping in mud or on ice the spindle 18 carrying the slipping wheel 20 and the smaller gear 42 meshed with the associated free wheeling gear 40 turns forward much faster than the other spindle 19, and causes the associated free wheeling gear 40 and the drive element 47 fast thereon to tend to turn faster in the direction of the arrow than the associated driven element 48 and inner countershaft 33 thus causing the ratchet assembly to drive the inner countershaft 33, which then cooperates with the associated small gear 37 fast thereon and larger gear 39 meshed therewith to drive the spindle 19 and wheel 21 forwardly thus to drive the vehicle forwardly.

Means for adapting the above mechanism for driving the vehicle rearwardly under similar conditions will now be described. Said countershafts are longitudinally shiftable transversely of said longitudinal pieces 13, 15 a distance greater than twice the width of the gears 42, 43, 37, 38; and means such as collars 54 fast on the inner shaft 33 prevent relative longitudinal shifting of the shafts. A shift collar 55 fast on the outer shaft 32 has a groove 56 therearound in which engages the active end 57 of a shift lever 58 fulcrumed on a bracket 59 on the cross piece 12, the motive arm 60 of the lever being connected by a link 61 to manual or other suitable means for shifting the lever, and shifting the shafts from the normal positions of the solid lines to the position of the dotted lines. A spring 62 on the shaft 33 compressed between the collar 55 and the piece 13 holds the shafts in normal position.

Four idler shafts 63, associated with the respective spindle carried gears and their intermeshing countershaft gears and rotatably mounted in brackets 64 (see Fig. 2) on adjacent longitudinal frame pieces, carry small idler gears or active parts 65 fast on the idler shafts and meshing respectively with the associated spindle carried gears 42, 38, 43 and 39. A larger idler gear 66 fast on each idler shaft is laterally offset from the adjacent associated small idler gear 65 a distance slightly greater than the width of the teeth of the adjacent countershaft carried gears 36, 37, 40 or 41, the off-set being in the direction of the shift of said countershafts, whereby when the countershafts are shifted the countershaft carried gears are shifted from mesh with spindle carried gears 38, 39, 42, 43 to mesh with the associated adjacent larger idler gear, whereby the relative direction of rotation of adjacent associated shaft and spindle carried gears is reversed, and the direction of drive of the ratchet clutch assembly which is still in the direction of the arrow is reversed relative to the direction of the spindles, whereby when the vehicle is normally driven rearwardly, the drive elements 47 still lag while the driven elements 48 and the countershafts free wheel faster, and when a spindle turns a predetermined degree faster rearwardly than the other spindle, such other spindle will be driven rearwardly by the faster moving spindle through the mechanism as previously described.

Thus when the driver is attempting to drive the vehicle rearwardly when one wheel 20 is on suitable pavement while the other wheel 21 is slipping in snow or mud or on ice, the countershafts are shifted to bring the gears to the dotted line positions, and the spindle 19 carrying the slipping wheel 21 and the smaller gear 43 meshed with the associated free wheeling gear 41 turns rearward much faster than the other spindle 18, and causes the associated free wheeling gear 41 and the drive element 46 fast therewith to tend to turn faster in the direction of the arrow than the associated driven element 48 and tubular countershaft 32 thus causing the ratchet assembly 46 to drive the tubular countershaft 32 which then cooperates with the associated small gear and larger gear and the idlers interposed therebetween to drive the other spindle rearwardly thus to drive the vehicle rearwardly. The rearward operation of the mechanism when the wheel 21 is on suitable pavement while the other is slipping will be readily understood from the foregoing.

The form of the invention of Fig. 3 and its operation on forward driving are substantially the same as in the form of the invention of Fig. 1 and Fig. 2. The chassis 10, its parts, the spindles 18, 19, wheels 20, 21 and differential mechanism and drive means are substantially the same as in Fig. 1. The large gears 38a, 39a, are slightly wider than the gears 38 and 39 of Fig. 1. The countershafts 32a, 33a are substantially the same but a trifle longer, while the gears 36, 37, 40, 41, 42, 43 are the same.

The large free wheeling gears or active parts 40, 41 are rotatably mounted free on said countershafts 33a, 32a respectively near and spaced from the end of each shaft remote from the small gear 36, 37 of the same shaft; and the rotary active parts or rims of the smaller gears 42, 43 fast on the respective spindles mesh with the free wheeling gears 40, 41. When the spindles 18, 19 rotate forwardly with the same speed as each other, each free wheeling gear rotates at slower speed than, and in the direction of, its associated countershaft.

In the form of invention of Fig. 3 internally coned clutch rings 70, 71 coaxially fast on the faces of the free wheeling gears 40, 41 receive externally coned clutch collars 72, 73 secured fast to outer drive elements 47, 47a of free wheeling ratchet assemblies 45, 45a, 46 and 46a adjacent to the collars, the assemblies having an inner driven element secured fast to the shaft carrying the associated free wheeling gear and adapted to be driven by and overrun the drive element. The assemblies 45, 46 are the same as in Figs. 1 and 2, while the assemblies 45a, 46a are constructed to drive in the opposite direction, in the direction of the arrows 51a. The countershaft 33a carries collars 54 preventing relative longitudinal shifting of the shafts; and the shaft assembly is shiftable in bearings in said longitudinal pieces of the chassis to engage one collar 72 or the other collar 73 of each assembly in clutching engagement with the associated rings 70 or 71. The shaft assembly is shiftable by the same means 55, 56, 57, 58, 59, 60, 61 as described in Fig. 1.

When the countershafts are thus shifted against the action of the spring 62, the gears 36, 37 shift to the position of the dotted lines, and still remain in mesh with the wide teeth of the gears 38a, 39a; but thrust collars 75 coaxial with, and on opposite sides of the free wheeling gears 40, 41, and carried by bracket rods 76 mounted in the longitudinal pieces 14, 15 prevent axial movements of the free wheeling gears, so that the collars 73 may have clutching engagement with the rings 71.

When the countershafts and collars 55, 72 and 73 are in the normal position of the solid lines of Fig. 3 the collars 72 are in clutching engagement with the rings 70, and when the vehicle is driven normally forwardly, the countershafts run faster than their associated free wheeling gears, and the drive elements 47 of the assemblies 45, 46 are driven at a slower speed than their associated countershafts and are overrun by the driven elements 48 of the assemblies 45, 46 and have no effect, and the drive elements 47a of assemblies 45a, 46a fast on the unclutched collars 73 are not driven by the free wheeling gears and have no effect. If the vehicle is being driven forwardly with the parts in the position of the solid lines of Fig. 3 and one wheel 20 or 21 turns much faster than the other, the assemblies 45, or 46 and the associated mechanisms operate as described for forward operation relative to Figs. 1 and 2.

If the vehicle is driven rearwardly and the countershaft and associated parts are shifted to the dotted line position, the assemblies 45, 46 are disconnected while the clutch collars 73 engage in the rings 71 and the drive elements 47a of the assemblies 45a, 46a are connected to free wheeling gears and the free wheeling gears may drive, or be overrun by, the countershafts in the direction of the arrows 51a. If the vehicle is driven normally rearwardly the countershafts merely overrun the free wheeling gears and the assemblies 45a, 46a have no effect.

Thus when the countershafts are shifted to the dotted line position and the driver is attempting to drive the vehicle rearwardly when one wheel 20 is on suitable pavement while the other wheel 21 is slipping in mud or on ice, the spindle 19 carrying the slipping wheel 21 and the smaller gear 43 meshed with the associated free wheeling gear 41 turns rearwardly much faster than the other spindle 18, and causes the associated free wheeling gear 41 and the associated collar 73 and drive element 47a to tend to turn faster in the direction of the arrow 51a than the associated driven element and countershaft 32a thus causing the ratchet assembly to drive the countershaft 32a which then cooperates with the associated small gear 36 and larger gear 38a meshed therewith to drive the spindle 18 rearwardly thus to drive the vehicle rearwardly.

If the countershafts are thus shifted and the driver is attempting to drive the vehicle rearwardly when the wheel 21 is on suitable pavement while the wheel 20 is slipping in mud or on ice, the spindle 18 carrying the wheel 20 and the smaller gear 42 meshed with the associated free wheeling gear 40 turns rearwardly much faster than the other spindle 19, and causes the associated free wheeling gear 40, and the associated collar 73 and drive element 47a to tend to turn faster in the direction of the arrow 51a than the associated driven element and countershaft 32a, thus causing the ratchet assembly to drive the countershaft 33a which then cooperates with the associated small gear 37 and larger gear 39a meshed therewith to drive the other spindles 19 and 21 rearwardly thus to drive the vehicle rearwardly.

While in the description of the operation of the mechanisms of Figs. 1 to 3, it is stated that the free wheeling gear associated with the faster driving spindle causes the ratchet assembly, through the countershaft and the associated small gear and larger gear meshed therewith, to drive the lagging spindle, it may be considered that the lagging spindle causes a braking action which retards the rotation of the associated countershaft, causing retardation of the free wheeling gear and the faster driving spindle, thus to cause the differential to drive the lagging spindle.

Because each free-wheel gear of Figs. 1 and 3 during normal driving rotates at a slower speed than the countershaft which it under certain circumstances drives, the control mechanism has no effect during normal driving. The size of the gear is such that the free wheeling gear rotates slowly enough to prevent the ratchet mechanism from having any braking or driving effect during ordinary turning of the vehicle, but the free wheeling gears rotate fast enough, one or the other, depending on which road wheel tends to turn at excessive speed with respect to the other, to effect the proper driving or braking action above described when excessive slipping of either drive wheel takes place.

In the form of the invention of Fig. 4 transverse drive spindles 18, 19 are mounted across a non-rotatable casing 10a and rotatably carry road wheels 20, 21 at the outer ends and differential sun miter gears 22, 23 on their inner ends near each other. A differential spider 25a having an extension 25b loosely rotatable on the spindle 18 and in a bearing 14a of the casing rotatably carries long and short alined stud-shafts 26a, 27a radial to the axis of the spindles and respectively carrying planet gears 26b, 27b loose on the inner ends of the stub shafts and meshing with the sun gears 22, 23. Said spider 25a is formed with a miter main ring gear 28a coaxial with the shafts and meshing with a miter main drive gear 29a carried on a longitudinal main drive shaft 30 rotatably mounted in a bearing 31 in the forward part of the casing 10a.

Small and large control miter gears 80, 81 fast on said short and long stub shafts or active parts 26a, 27a respectively are disposed respectively adjacent to and slightly more than gear thickness distance from the spider 25a. A rotary control housing 82 has a tubular bearing extension 83 loosely rotatable on the other spindle 19 and in the bearing 15a of the casing. Said housing surrounds the control gears 80, 81 and is provided with a small inner ring 85 meshing with one side of the small control gear 80 and a larger inner ring gear 86 meshing with the opposite side of the large control gear 81, whereby when the housing 82 is rotated relative to the spider, the stub shafts 26a, 27a are driven around their axis in the direction of the arrows 51b and 51c.

The tooth numbers of gears 80, 81, 85 and 86 are such that the stub shafts 26a and 27a always rotate at the same speed, and that speed is designed to be, for any given drive shaft speed, the maximum speed to be assumed by the planet gears about their respective stub shafts under the maximum speed ratio that is permitted to exist between drive wheels 20 and 21 by the limiting action of the mechanism herein described.

A sleeve 88 loosely mounted on the main drive shaft 30 between upper and lower collars 89, 90 fast on the shaft carries loosely rotatable thereon large and small loose miter gears or rotary motive parts 91, 92 respectively meshing with large and small outer ring gears 93, 94 fast on the housing 82. The gear 29a fast on the sleeve meshes with the gear 28a of the spider.

Fast on the gears 91, 92 are upper and lower castellations 95, 96 which are engageable one at a time, with a castellated collar 97 provided with helical cam slots 98 and longitudinal guide slots 99 in which are slidably respectively received the radial actuating pins 100 mounted fast in the shaft 30 and projecting through transverse window slots 100' in the sleeve 88 and guide pins 101 mounted fast in the sleeve 88. The lug 102 on the collar 90 riding in the slot 103 in the gear 29a and sleeve 88 allows limited movement of the shaft 30 and drives the gear 29a in one direction or the other when the shaft 30 rotates in one direction or the other.

When the drive shaft 30 moves in the direction of the arrow 104 of Fig. 4, as when the vehicle is being driven forwardly, the pins 100 move rightwardly and cam against the walls of the cam slots 98 to force the collar 97 into clutching engagement with the castellations 96 of the small gear 92 to drive the forward part of the housing 82 downward at less speed than the spider, since the gear 92 is effectively smaller than the main drive gear 29a, thus moving the forward part of the housing upwardly relative to the spider and rotating the control gears 80, 81 to the left.

When the shaft 30 rotates in the direction of the arrow 105, Fig. 5, as when the vehicle is driven rearwardly, the pins 100 force the collar 97 upwardly to mesh with the castellations 95 and drive the large gear 91 in the direction of the arrow 105. As the gear 91 is effectively larger than the gear 29a, the forward part of the housing 82 is driven upwardly faster than is the forward part of the spider, thus moving the forward part of the housing upwardly relative to the spider and rotating the control gears 80, 81 to the left.

Thus the forward part of the housing when rotating always moves upwardly relative to the spider and the rear part of the housing always moves downwardly relative to the spider. Therefore the gear 80, engaged on the right by the gear 85, always rotates leftwardly, and the gear 81 engaged on the left by the gear 86 always also rotates leftwardly. Thus the gears 80, 81 rotate leftwardly only in the direction of the arrows 51b, 51c.

Instead of the automatic shift of the collar 97, I may provide a groove therein similar to the groove 56 and shift this collar by means such as the means 57, 58, 60, 61 of Figs. 1 and 3.

Free wheeling ratchet assemblies 110, 111 similar to the assembly 45 of Fig. 3 are associated with the planet gears 26b, 27b respectively. The assemblies respectively comprise outer drive elements 47a, 47b secured fast to the planet gears and inner driven elements secured fast on the stub shafts 26a, 27a and constructed and adapted to be held or retarded or driven by or overrun the drive elements and planet gear in said constant leftward direction of rotation of the stub shaft, indicated by the arrows 51b, 51c, whereby when the stub shafts and spider are normally rotating and the planet gears are stationary relative to the spider as when the vehicle is driven in a straight line, the stub shafts overrun the planet gears and have no effect. But since the control gear stub-shafts both rotate in the same direction of the arrows, to the left, if one spindle lags considerably behind the other spindle the planet gears will rotate in opposite directions relative to each other when viewed as in Fig. 4, and one planet gear will tend to further overrun its stub shaft while the other planet gear will cause the rollers of the free wheeling element associated therewith to jam and thus prevent it from running as fast as the first planet is tending to do. The jamming of said rollers will thus cause the associated planet to drive the sun gear associated with the lagging spindle, and the road wheel fixed thereon, in the direction of the rotation of the spider.

Therefore when the driver is attempting to drive the vehicle forwardly while one wheel 20 is on suitable pavement and the other wheel 21 is slipping in mud or snow or on ice, the sun gear 22 may for the time remain stationary while the sun gear 23 rotates forwardly at high speed while the rearward part of the spider moves upwardly as the spider rotates forwardly at half the speed of the sun gear, thus causing the planet gear 27b to rotate at high speed leftwardly to overtake the slowly leftwardly rotating control gear 81 until resisted and retarded by the leftwardly rotating retarding element of the assembly 111 of the shaft 27a associated with the control gear 81 thus causing the planet gear 27b to drive the sun gear 22 and cause the car to be driven forwardly. At the same time, the forward part of the spider moves downwardly while the sun gear 22 is stationary thus causing the gear 26b to rotate rightwardly free from the leftwardly rotating control gear 80, thus having no effect and leaving the planet gear 27b free to operate and drive as just stated.

If the driver is attempting to drive the vehicle forwardly when one wheel 21 is on suitable pavement and the other wheel 20 is slipping in mud or snow or on ice, the sun gear 23 may for the time remain stationary while the sun gear 22 rotates forwardly at high speed while the forward part of the spider moves downwardly as the spider rotates forwardly at half the speed of the sun gear, thus causing the planet gear 26b to rotate at high speed leftwardly to overtake the slowly leftwardly rotating retarding element of the assembly 110 associated with the control gear 80 thus causing the planet gear 26b to drive the sun gear 23 forwardly and cause the car to be driven forwardly. At the same time, the rear part of the spider moves upwardly while the sun gear 23 is stationary thus causing the planet gear 27b to rotate rightwardly free from the leftwardly rotating control gear 81, thus having no effect and leaving the planet gear 26b free to operate and drive as just stated.

When the driver is attempting to drive the vehicle rearwardly while one wheel 20 is on suitable pavement and the other wheel 21 is slipping in mud or snow or on ice, the sun gear 22 may for the time remain stationary while the sun gear 23 rotates rearwardly at high speed while the forward part of the spider moves upwardly as the spider rotates rearwardly at half the speed of the sun gear 23, thus causing the planet gear 26b to rotate at high speed leftwardly to overtake the slowly leftwardly rotating control gear 80 and stub shaft 26a and be slowed by the leftwardly rotating retarding element of the assembly 110 associated with the control gear 80 thus causing the planet gear to drive the sun gear 22, spindle 18 and wheel 20 and cause the car to be driven rearwardly. At the same time, the rear part of the spider moves downwardly while the gear 22 is stationary thus causing the gear 27b to rotate rightwardly free from the leftwardly rotating control gear 81, thus having no effect and leaving the planet gear 26b free to operate and drive as just stated.

If the driver is attempting to drive the vehicle rearwardly when one wheel 21 is on suitable pavement and the other wheel 20 is slipping in mud or snow or on ice, the sun gear 23 may for the time remain stationary while the sun gear 22 rotates rearwardly at high speed while the rear part of the spider moves downwardly as the spider rotates rearwardly at half the speed of the sun gear, thus causing the planet gear 27b to rotate at high speed leftwardly to overtake the slowly leftwardly rotating control gear 81 until resisted and slowed or stopped by the leftwardly rotating retarding element of the assembly 111 associated with the control gear 81 thus causing the planet gear 27b to drive the sun gear 23 and cause the car to be driven rearwardly. At the same time, the forward part of the spider moves upwardly while the gear 23 is stationary thus causing the gear 26b to rotate rightwardly free from the leftwardly rotating control gear 80, thus having no effect and leaving the planet gear 27b free to operate and drive as just stated.

I claim as my invention:

1. In combination, drive spindles; a differential mechanism driving the spindles; a pair of countershafts each carrying a free wheeling member geared to one spindle, its shaft being geared to the other spindle; a free wheeling ratchet assembly interposed between each free wheeling member and the shaft carrying it constructed and adapted to allow both shafts to be driven by and overrun the respective free wheeling members in the same direction; the gear connection being such that normally each free wheeling member rotates at slower speed than, and in the direction of, its associated countershaft; and means associated with each free wheeling member for reversing the direction of drive of the associated assembly.

2. In combination, transverse drive spindles; a differential mechanism driving the spindles; coaxial countershafts held against relative longitudinal movement and rotatably mounted parallel to the spindles; meshing gears mounted on the spindles and countershafts respectively and connecting the countershafts to the spindles respectively; large free wheeling gears mounted free on said countershafts respectively; smaller gears fast on the respective spindles each meshing with the free wheeling gear of the shaft geared to the other spindle; the number and size of the gears being such that normally each free wheeling gear rotates at slower speed than, and in direction of, its associated countershaft; a ratchet clutch assembly connecting each countershaft with its free wheeling gear and adapted when the spindle carrying the smaller gear meshed with an associated free wheeling gear turns faster than its associated countershaft to drive such countershaft; means for longitudinally shifting the countershafts and the gears carried thereby; a rotatably mounted idler shaft associated with each spindle carried gear and its intermeshing countershaft carried gear; a small idler gear fast on each idler shaft and meshing with the associated spindle carried gear; a larger idler gear fast on each idler shaft and laterally offset from the adjacent associated countershaft carried gear a distance slightly greater than the width of the teeth of such shaft carried gear in the direction of the shift of said shafts and adapted to mesh with the associated adjacent shaft carried gears when shifted.

3. In combination, drive spindles; a differential mechanism driving the spindles; a pair of countershafts, each carrying a free wheeling member geared to one spindle, its shaft being geared to the other spindle; a pair of clutches selectively operable to clutching engagement with each member; a free wheeling ratchet assembly interposed between each clutch and the shaft carrying the associated free wheeling member and constructed and adapted to allow both shafts to be driven by and overrun the respective free wheeling members in the same direction when one clutch is in clutching engagement with each member, and in the reverse direction when the other collar is engaged with the member.

4. In combination, drive spindles; a differential mechanism driving the spindles; a pair of countershafts, each carrying a free wheeling member geared to one spindle, its shaft being geared to the other spindle; a pair of clutch collars selectively shiftable to clutching engagement with each member; a free wheeling ratchet assembly interposed between each collar and the shaft carrying the associated free wheeling member and constructed and adapted to allow both shafts to be driven by and overrun the respective free wheeling members in the same direction when one collar is engaged with each member, and in the reverse direction when the other collar is engaged with the member; the gear connection being such that normally each free wheeling member rotates at slower speed than, and in the direction of, its associated countershaft.

5. In combination, transverse drive spindles; a differential mechanism driving the spindles; a tubular countershaft and an inner countershaft therein relatively rotatably mounted parallel to and respectively geared to the spindles; free wheeling gears mounted free on said countershafts respectively; gears fast on the respective spindle each meshing with the free wheeling gear of the shaft geared to the other spindle; a clutch collar adjacent to each face of each free wheeling gear and shiftable to clutching relation with its adjacent gear; means for holding the free wheeling gears against axial movement; means to shift the shafts and collars longitudinally to cause one or the other clutch collar of each assembly to engage the associated ring; a free wheeling ratchet assembly interposed between each collar and the shaft carrying the associated free wheeling gear and constructed and adapted to allow both shafts to be driven by and overrun their respective free wheeling gears in the same direction when the shafts are in one position, and both in the reverse direction when the shafts are shifted to other position; the number and size of the gears being such that normally each free wheeling gear rotates at slower speed than, and in the direction of, its associated countershafts.

6. In combination, rotary spindles carrying sun gears thereon; a differential spider carrying alined rotary radial stub shafts carrying planet gears free wheeling thereon and meshing with the sun gears; means for rotating the spider in either direction; means for rotating the stub shafts on their common axis in a predetermined same constant direction; and a free wheeling ratchet clutch assembly interposed between each planet gear and associated stub shaft and constructed to allow the stub shaft to overrun the planet gear in said predetermined direction and to prevent movement relative to the planet gear in the opposite direction.

7. In combination, a support; alined spindles rotary thereon carrying sun gears; a differential spider carrying alined rotary radial stub-shafts carrying planet gears free wheeling on the stub shafts and meshing with the sun gears; means for rotating the spider in either direction; a rotary housing coaxial with the spider; means for rotating the housing slowly relative to the spider in the same constant direction relative to the spider; means driven by the rotating housing for driving the stub shafts in a predetermined same constant direction; and a free wheeling ratchet clutch assembly interposed between each planet gear and associated stub shaft and constructed to allow the stub shaft to overrun or be driven by the planet gear in said predetermined direction or to be held against movement relative to the planet gear in the opposite direction.

8. In combination, alined rotary spindles; a differential spider carrying alined rotary radial stub shafts carrying planet gears free wheeling on the stub shafts and meshing with the sun gears; means for rotating the spider in either direction; a rotary housing coaxial with the spider; means for rotating the housing in the same constant direction relative to the spider when the spider rotates in either direction; means driven by the rotating housing for driving the stub shafts in a predetermined same constant direction; and a free wheeling ratchet clutch assembly interposed between each planet gear and associated stub shaft and constructed to allow the stub shaft to overrun the planet gear in said predetermined direction or to be held against movement relative to the planet gear in the opposite direction.

9. A system comprising a spider carrying a pair of similar planet gear elements; a drive element for rotating the spider; a pair of similar spindle elements having sun gears meshing with the planet gear elements; and means for preventing excessive difference between the speed of the spindle elements comprising a train of mechanism having a rotary motive part, and an active part driven by the train at less speed than the motive part and constructed and adapted to be operatively connected to a certain one of the elements of one of said pairs to constrain its movement to prevent such difference, and drive means driven by one of said elements of the system other than said certain ones for driving said motive part; and ratchet means between said active part and the element constrained by such active part to allow such element to overrun the active part when the direction of drive of the drive means is reversed.

10. A system comprising a spider carrying a pair of similar planet gear elements; a drive element for rotating the spider; a pair of similar spindle elements having sun gears meshing with the planet gear elements; and means for preventing excessive difference between the speed of the spindle elements comprising a train of mechanism having a rotary motive part at the motive end of said train remote from, and free of connection with the spider, and an active part driven by the train at less speed than the motive part and constructed and adapted to be operatively connected to a certain one of the elements of one of said pairs to constrain its movement to prevent such difference, and drive means driven by one of said elements of the system other than said certain one for driving said motive part; and ratchet means between said active part and the element constrained by such active part to allow such element to overrun the active part when the direction of drive of the drive means is reversed.

11. A system comprising a spider carrying a pair of similar planet gear elements; a drive element for rotating the spider; a pair of similar spindle elements having sun gears meshing with the planet gear elements; and means for preventing excessive difference between the speed of the spindle elements comprising a train of mechanism having a rotary motive part at the motive end of said train remote from, and free of connection with the spider, and an active part driven by the train at less speed than the motive part and constructed and adapted to be operatively connected to a certain one of the spindle elements to constrain its movement to prevent such difference, and drive means driven by one of said spindle elements of the system other than said certain one for driving said motive part; and ratchet means between said active part and the spindle element constrained by such active part to allow such element to overrun the active part when the direction of drive of the drive means is reversed.

12. A system comprising a spider carrying a pair of similar planet gear elements; a drive element for rotating the spider; a pair of similar spindle elements having sun gears meshing with the planet gear elements; and means for preventing excessive difference between the speed of the spindle elements comprising a train of mechanism having a rotary motive part, at the motive end of said train remote from, and free of connection with the spider, and an active part driven by the train at less speed than the motive part and constructed and adapted to be operatively connected to one of the planet gear elements to constrain its movement to prevent such difference, and drive means driven by one of said elements of the system other than said planet gear elements for driving said motive part; and ratchet means between said active part and the planet gear element constrained by such motive part to allow such element to overrun the active part when the direction of drive of the drive means is reversed.

References Cited in the file of this patent

UNITED STATES PATENTS

| | | |
|---|---|---|
| 1,207,501 | Clayberg | Dec. 5, 1916 |
| 1,352,269 | Indahl | Sept. 7, 1920 |
| 1,368,435 | Higinbotham | Feb. 15, 1921 |
| 1,756,939 | Crawford | May 6, 1930 |
| 1,938,457 | McCaffrey | Dec. 5, 1933 |
| 2,103,143 | Brown | Dec. 21, 1937 |
| 2,295,492 | Stegmeir | Sept. 8, 1942 |

FOREIGN PATENTS

| | | |
|---|---|---|
| 488,125 | France | Sept. 5, 1918 |
| 883,892 | France | Apr. 5, 1943 |